US011967294B2

(12) United States Patent
Uehata et al.

(10) Patent No.: US 11,967,294 B2
(45) Date of Patent: Apr. 23, 2024

(54) LIQUID CRYSTAL DISPLAY DEVICE AND DRIVING METHOD THEREFOR

(71) Applicant: Sharp Display Technology Corporation, Kameyama (JP)

(72) Inventors: Masaki Uehata, Kameyama (JP); Yasuki Mori, Kameyama (JP); Kohji Saitoh, Kameyama (JP); Takayuki Mizunaga, Kameyama (JP); Kazuya Kondoh, Kameyama (JP); Takashi Nojima, Kameyama (JP); Kazuhisa Yoshimoto, Kameyama (JP); Kosuke Kawamoto, Kameyama (JP); Hiroyuki Kito, Kameyama (JP); Kazuki Nakamichi, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/141,908

(22) Filed: May 1, 2023

(65) Prior Publication Data

US 2024/0005885 A1 Jan. 4, 2024

(30) Foreign Application Priority Data

May 18, 2022 (JP) ................................ 2022-081459

(51) Int. Cl.
*G09G 3/36* (2006.01)

(52) U.S. Cl.
CPC ....... *G09G 3/36* (2013.01); *G09G 2310/0202* (2013.01); *G09G 2310/0291* (2013.01); *G09G 2310/08* (2013.01); *G09G 2320/0209* (2013.01); *G09G 2320/0247* (2013.01); *G09G 2330/021* (2013.01)

(58) Field of Classification Search
CPC ........................................................ G09G 3/36
See application file for complete search history.

(56) References Cited

U.S. PATENT DOCUMENTS

| | | | | |
|---|---|---|---|---|
| 6,677,925 | B1 | 1/2004 | Kawaguchi et al. | |
| 9,330,624 | B1 * | 5/2016 | Pei | H03F 3/2173 |
| 2002/0041281 | A1 | 4/2002 | Yanagi et al. | |

(Continued)

FOREIGN PATENT DOCUMENTS

| | | | |
|---|---|---|---|
| JP | 2001-147420 | A | 5/2001 |
| JP | 2002-116739 | A | 4/2002 |
| JP | 2019-133019 | A | 8/2019 |

*Primary Examiner* — Chanh D Nguyen
*Assistant Examiner* — Nguyen H Truong
(74) *Attorney, Agent, or Firm* — ScienBiziP, P.C.

(57) ABSTRACT

A common electrode driver includes an inverting amplifier including a first resistor, a second resistor, and an operational amplifier, and a resistance ratio adjustment circuit that adjusts, in accordance with a length of one horizontal scan period, a resistance ratio being a ratio of a resistance value of the second resistor to a resistance value of the first resistor. A feedback voltage is provided to one end of the first resistor. The resistance ratio adjustment circuit sets the resistance ratio when second driving is performed, in which a length of one horizontal scan period is a second time longer than a first time, to be smaller than the resistance ratio when first driving is performed, in which a length of one horizontal scan period is the first time.

6 Claims, 10 Drawing Sheets

(56) References Cited

U.S. PATENT DOCUMENTS

| | | | | |
|---|---|---|---|---|
| 2007/0146260 | A1* | 6/2007 | Kang | G09G 3/3655<br>345/87 |
| 2017/0309237 | A1* | 10/2017 | Lee | G09G 3/3648 |
| 2018/0040286 | A1* | 2/2018 | Huang | G09G 3/3611 |
| 2019/0235336 | A1 | 8/2019 | Jehata et al. | |
| 2019/0244576 | A1* | 8/2019 | Kwak | G09G 3/3655 |
| 2020/0090596 | A1* | 3/2020 | Oh | G09G 3/3406 |
| 2021/0358446 | A1* | 11/2021 | Xiao | G09G 3/36 |

* cited by examiner

LIQUID CRYSTAL DISPLAY DEVICE AND DRIVING METHOD THEREFOR

CROSS-REFERENCE TO RELATED APPLICATIONS

This application claims the benefit of priority to Japanese Patent Application Number 2022-081459 filed on May 18, 2022. The entire contents of the above-identified application are hereby incorporated by reference.

BACKGROUND

Technical Field

The following disclosure relates to a liquid crystal display device that operates while switching between at least two drive frequencies, and a driving method for the liquid crystal display device.

Known liquid crystal display devices have been used in various devices such as televisions, notebook computers, and portable phones. A display portion of a liquid crystal display device is provided with a plurality of pixel electrodes to which a video signal corresponding to a target display image is provided, and a common electrode for applying a voltage between the plurality of pixel electrodes via a liquid crystal. The common electrode is formed on a substrate constituting a liquid crystal panel, and a predetermined voltage is supplied from a circuit provided on the drive substrate to the common electrode. Note that, as described later, a value of a voltage output from the circuit provided on the drive substrate to the common electrode does not necessarily coincide with a value of an actual voltage of the common electrode in the liquid crystal panel. Thus, in this specification, for the sake of convenience, the voltage output from the circuit provided on the drive substrate to the common electrode is referred to as an "output common voltage", and the voltage of the common electrode in the liquid crystal panel is referred to as an "in-panel common voltage". When the output common voltage and the in-panel common voltage are not distinguished from each other, the term "common voltage" is used. Note that the common voltage (voltage of the common electrode) is often referred to as "Vcom".

In recent years, there has been an increasing demand for low power consumption in liquid crystal display devices. One known driving method for achieving low power consumption is referred to as low-frequency driving. In low-frequency driving, a drive frequency of a liquid crystal display device is reduced to ½, ⅓, or the like of a standard frequency. Since the drive frequency of a known general liquid crystal display device is 60 Hz, the drive frequency is reduced to 30 Hz, 20 Hz, or the like when the low-frequency driving is adopted.

There is also a liquid crystal display device in which switching between normal driving and the low-frequency driving is performed during operation. Since the drive frequencies are different between the normal driving and the low-frequency driving, the refresh cycles (cycles of writing a video signal to a liquid crystal capacitance) are also different. Due to such a difference in the refresh cycles, flicker may be visually recognized. The reason is that the magnitude of the influence of a leakage current on an effective voltage is different between the normal driving and the low-frequency driving, resulting in an effective voltage imbalance.

JP 2002-116739 A discloses a liquid crystal display device including an offset voltage setting unit for suppressing the occurrence of flicker caused by an effective voltage imbalance. The offset voltage setting unit switches a level of a common voltage for each refresh period having a different length. In this way, a value of the common voltage serving as a reference for determining the effective voltage of the positive polarity and the effective voltage of the negative polarity is appropriately set in accordance with a refresh cycle (a length of the refresh period), and the occurrence of flicker is suppressed.

However, even when the offset voltage setting unit as described above is included, an in-panel common voltage fluctuates due to presence of a parasitic capacitance and the like formed between a source bus line (video signal line) and a common electrode, for example, depending on the display image. Specifically, even when an output common voltage is a constant voltage for each drive frequency as indicated by a thick dotted line denoted by a reference sign 91 in FIG. 7, the in-panel common voltage fluctuates as indicated by a solid line denoted by a reference sign 92 in FIG. 7, depending on the display image. Due to such fluctuation of the in-panel common voltage, a display abnormality referred to as crosstalk may occur. In this regard, even when the in-panel common voltage fluctuates, crosstalk does not occur as long as the in-panel common voltage converges to a target constant voltage by the end of each horizontal scan period. On the other hand, when the in-panel common voltage does not converge to the target constant voltage by the end of each horizontal scan period, crosstalk occurs. Therefore, crosstalk is likely to occur particularly when a charging period (a length of one horizontal scan period) of a liquid crystal is short in order to perform high-resolution display.

One example of crosstalk will now be described with reference to FIG. 8. In a display portion illustrated in FIG. 8, it is assumed that a killer pattern is displayed in a region P1 and a halftone image is displayed in regions P2 to P5. In such a case, a boundary between the region P2 and the region P3, a boundary between the region P2 and the region P4, a boundary between the region P3 and the region P5, and a boundary between the region P4 and the region P5 are visually recognized. FIG. 8 indicates these boundaries by thick dotted lines.

For example, JP 2019-133019 A discloses a liquid crystal display device including a circuit referred to as a "Vcom feedback circuit" for suppressing the occurrence of crosstalk as described above. As illustrated in FIG. 9, a Vcom feedback circuit 900 includes a resistor 901, a resistor 902, and an operational amplifier 903. From the connection relationship between the resistor 901, the resistor 902, and the operational amplifier 903, it is understood that the Vcom feedback circuit 900 is formed of an inverting amplifier. With such a configuration, the Vcom feedback circuit 900 outputs, as an output common voltage VcomOUT, a voltage obtained by correcting a reference voltage VREF based on a voltage (hereinafter, simply referred to as a "feedback voltage") VcomFB obtained by feeding back an in-panel common voltage through a dedicated wiring line. In such a Vcom feedback circuit 900, a ratio between a resistance value of the resistor 901 and a resistance value of the resistor 902 is adjusted such that the in-panel common voltage converges to a target constant voltage by the end of each horizontal scan period. In this way, the occurrence of crosstalk is suppressed even when the in-panel common voltage fluctuates.

Note that JP 2001-147420 A discloses a technique for generating an output common voltage based on a coupling signal corresponding to a sum of the outputs of all data signal lines.

SUMMARY

In a case where a liquid crystal display device including a Vcom feedback circuit is configured to switch between normal driving in which a drive frequency is 60 Hz and low-frequency driving in which a drive frequency is 30 Hz, when a waveform of an output common voltage is a waveform as indicated by a thick dotted line denoted by a reference sign 93 in FIG. 10, an in-panel common voltage fluctuates as indicated by a solid line denoted by a reference sign 94 in FIG. 10, for example.

Regarding the Vcom feedback circuit 900 (see FIG. 9), when a ratio of the resistance value of the resistor 902 to the resistance value of the resistor 901 is referred to as a "correction intensity", as a value of the correction intensity increases, the time required for the in-panel common voltage to converge is shorter, but the power consumption in the operational amplifier 903 is greater. Since the correction intensity has a constant value in the known Vcom feedback circuit 900, as understood from FIG. 10, the in-panel common voltage converges similarly at the time of the normal driving (60 Hz drive period) and at the time of the low-frequency driving (30 Hz drive period). Looking at a section denoted by a reference sign 95 in FIG. 10, in order to suppress the occurrence of crosstalk, the in-panel common voltage is to converge by a point in time ta. However, in the example illustrated in FIG. 10, the in-panel common voltage converges at a point in time tb that is considerably earlier than the point in time ta. This means that the correction intensity is unnecessarily great in the period during which the low-frequency driving is performed, and power is wastefully consumed. Therefore, as described above, in recent years, there has been an increasing demand for low power consumption in liquid crystal display devices.

Thus, an object of the following disclosure is to realize a liquid crystal display device capable of suppressing the occurrence of crosstalk while suppressing an increase in power consumption.

(1) A liquid crystal display device according to some embodiments of the disclosure includes:

a display portion including a plurality of video signal lines, a plurality of scanning signal lines, a plurality of pixel electrodes provided corresponding to each of intersections between the plurality of video signal lines and the plurality of scanning signal lines, and a common electrode provided common to the plurality of pixel electrodes;

a video signal line drive circuit configured to drive the plurality of video signal lines;

a scanning signal line drive circuit configured to drive the plurality of scanning signal lines; and a common electrode drive circuit configured to drive the common electrode, in which the common electrode drive circuit includes an operational amplifier including an inverting input terminal, a non-inverting input terminal provided with a reference voltage being a voltage to be applied to the common electrode, and an output terminal connected to the common electrode, a first resistor having one end provided with a feedback voltage of a voltage of the common electrode, and having an other end connected to the inverting input terminal of the operational amplifier, a second resistor having one end connected to the inverting input terminal of the operational amplifier, and having an other end connected to the output terminal of the operational amplifier, and a resistance ratio adjustment circuit configured to adjust, in accordance with a length of one horizontal scan period, a resistance ratio being a ratio of a resistance value of the second resistor to a resistance value of the first resistor, and the resistance ratio adjustment circuit controls the resistance value of at least one of the first resistor and the second resistor to set the resistance ratio when second driving is performed, in which a length of one horizontal scan period is a second time longer than a first time, to be smaller than the resistance ratio when first driving is performed, in which a length of one horizontal scan period is the first time.

(2) Further, the liquid crystal display device according to some embodiments of the disclosure includes the configuration of (1) described above, in which, provided that N is a number greater than 1 and the second time is N times the first time, the resistance ratio adjustment circuit sets the resistance ratio when the second driving is performed to be 1/N of the resistance ratio when the first driving is performed.

(3) Further, the liquid crystal display device according to some embodiments of the disclosure includes the configuration of (1) described above, in which the first resistor is a variable resistor, and the resistance ratio adjustment circuit adjusts the resistance ratio by changing a resistance value of the first resistor.

(4) Further, the liquid crystal display device according to some embodiments of the disclosure includes the configuration of (1) described above, in which the second resistor is a variable resistor, and the resistance ratio adjustment circuit adjusts the resistance ratio by changing a resistance value of the second resistor.

(5) Further, the liquid crystal display device according to some embodiments of the disclosure includes the configuration of (1) described above, in which the first resistor and the second resistor are each a variable resistor, and the resistance ratio adjustment circuit adjusts the resistance ratio by changing a resistance value of the first resistor and a resistance value of the second resistor.

(6) The liquid crystal display device according to some embodiments of the disclosure includes the configuration of any of (1) to (5) described above, in which the common electrode drive circuit further includes a reference voltage changing circuit configured to set a different voltage value of the reference voltage provided to the non-inverting input terminal of the operational amplifier when the first driving is performed and when the second driving is performed.

(7) Further, a driving method according to some embodiments of the disclosure is a driving method for a liquid crystal display device, in which the liquid crystal display device includes a display portion including a plurality of video signal lines, a plurality of scanning signal lines, a plurality of pixel electrodes provided corresponding to each of intersections between the plurality of video signal lines and the plurality of scanning signal lines, and a common electrode provided common to the plurality of pixel electrodes, a video signal line drive circuit configured to drive the plurality of video signal lines, a scanning signal line drive circuit configured to drive the plurality of scanning signal lines, and a common electrode drive circuit configured to drive the common electrode, the common electrode drive circuit includes an operational amplifier including an inverting input terminal, a non-inverting input terminal provided with a reference voltage being a voltage to be applied to the common electrode, and an output terminal connected to the common electrode, a first resistor having one end provided with a feedback voltage of a voltage of the common electrode, and having an other end connected to the inverting input terminal of the operational amplifier, and a second resistor having one end connected to the inverting input terminal of the operational amplifier, and having an other end connected to the output terminal of the operational amplifier, the driving method includes adjusting, in accordance with a length of one horizontal scan period, a resistance ratio being a ratio of a resistance value of the second resistor to a resistance value of the first resistor, and, in the adjusting, the resistance value of at least one of the first resistor and the second resistor is controlled to set the resistance ratio when second driving is performed, in which a length of one horizontal scan period is a second time longer than a first time, to be smaller than the resistance ratio when first driving is performed, in which a length of one horizontal scan period is the first time.

In the liquid crystal display device according to some embodiments of the disclosure, the common electrode drive circuit includes the inverting amplifier including the operational amplifier, the first resistor (one end of the first resistor being provided with the feedback voltage of the voltage of the common electrode), and the second resistor, and the resistance ratio adjustment circuit that adjusts, in accordance with a length of one horizontal scan period, a resistance ratio (a ratio of a resistance value of the second resistor to a resistance value of the first resistor). Since a voltage obtained by correcting the reference voltage based on the feedback voltage of the voltage of the common electrode is supplied to the common electrode by providing the inverting amplifier as described above, it is possible to suppress the occurrence of crosstalk by appropriately setting a resistance value of the first resistor and the second resistor. Further, in a case where switching between the first driving in which a length of one horizontal scan period is the first time and the second driving in which a length of one horizontal scan period is the second time longer than the first time is performed, the resistance ratio adjustment circuit sets the resistance ratio when the second driving is performed to be smaller than the resistance ratio when the first driving is performed. In this way, the power consumption in the operational amplifier during the period in which the second driving is performed is reduced. Thus, as described above, a liquid crystal display device capable of suppressing the occurrence of crosstalk while suppressing an increase in power consumption is realized.

BRIEF DESCRIPTION OF DRAWINGS

The disclosure will be described with reference to the accompanying drawings, wherein like numbers reference like elements.

DESCRIPTION OF EMBODIMENTS

An embodiment will be described below with reference to the accompanying drawings.

1. Overall Configuration and Operation Outline

Figure 2:
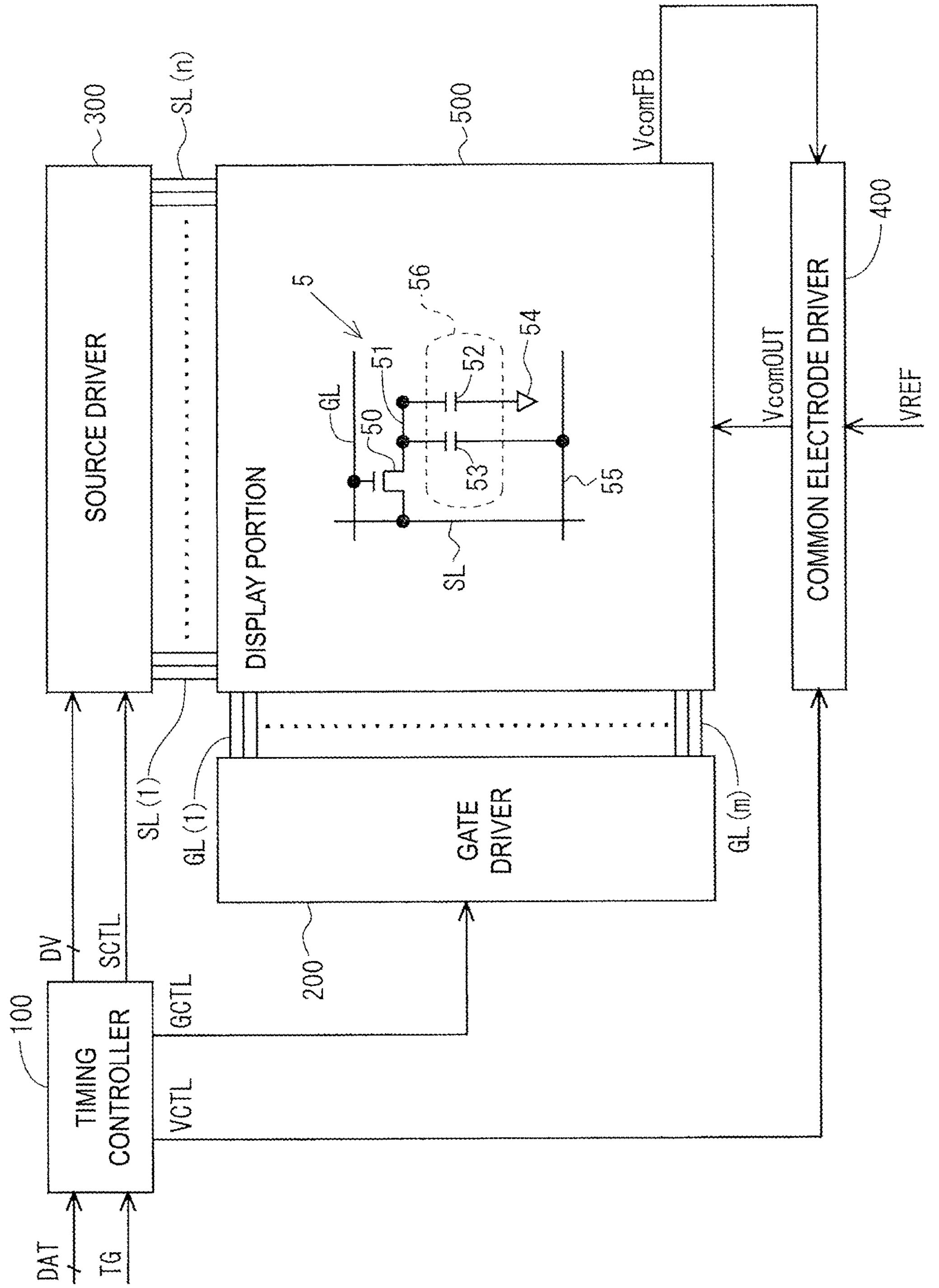
FIG. 2 is a block diagram illustrating a general configuration of a liquid crystal display device according to the embodiment.

FIG. 2 is a block diagram illustrating an overall configuration of a liquid crystal display device according to one embodiment. The liquid crystal display device includes a timing controller 100, a gate driver (scanning signal line drive circuit) 200, a source driver (video signal line drive circuit) 300, a common electrode driver (common electrode drive circuit) 400, and a display portion 500. Note that FIG. 2 is a diagram illustrating a functional configuration, and thus, the positional relationships between constituent elements, and the like are different from actual relationships, and the like.

In the display portion 500, there are disposed a plurality of source bus lines (video signal lines) SL and a plurality of gate bus lines (scanning signal lines) GL. A pixel forming section 5 for forming a pixel is provided corresponding to each of intersections between the plurality of source bus lines SL and the plurality of gate bus lines GL. In other words, the display portion 500 includes a plurality of the pixel forming sections 5. Each pixel forming section 5 includes a thin film transistor (pixel TFT) 50 serving as a switching element, in which a control terminal is connected to the gate bus line GL passing through the corresponding intersection and a first conduction terminal is connected to the source bus line SL passing through the above corresponding intersection, a pixel electrode 51 connected to a second conduction terminal of the thin film transistor 50, a common electrode 54 and an auxiliary capacitance electrode 55 provided common to the plurality of pixel forming sections 5 (i.e., the common electrode 54 and the auxiliary capacitance electrode 55 provided common to the plurality of pixel electrodes 51), a liquid crystal capacitance 52 formed by the pixel electrode 51 and the common electrode 54, and an auxiliary capacitance 53 formed of the pixel electrode 51 and the auxiliary capacitance electrode 55. A pixel capacitance 56 is constituted of the liquid crystal capacitance 52 and the auxiliary capacitance 53. In FIG. 2, only one pixel forming section 5 is illustrated.

Figure 3:
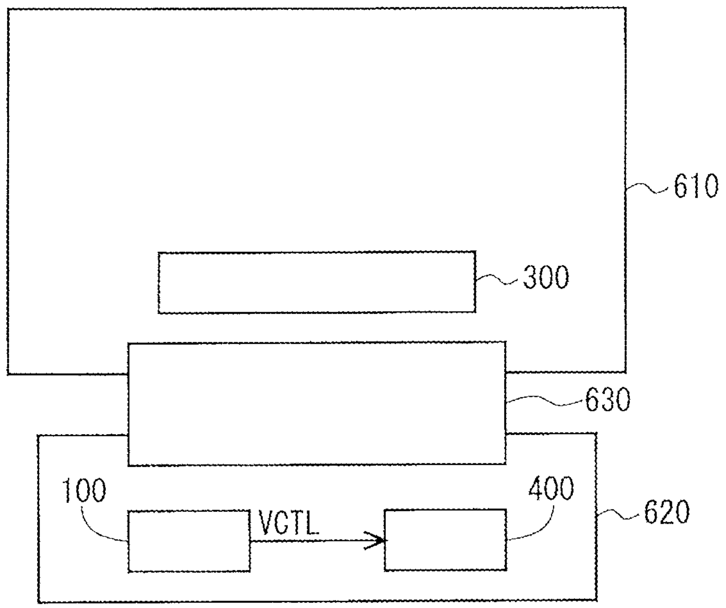
FIG. 3 is a diagram for describing a configuration of a substrate of the liquid crystal display device according to the embodiment.
Figure 4:
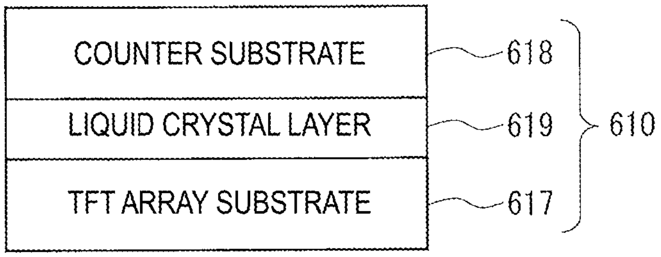
FIG. 4 is a schematic diagram illustrating a configuration of a liquid crystal panel according to the embodiment.

FIG. 3 is a diagram for describing a configuration of a substrate of the liquid crystal display device. Note that the configuration described hereinafter is merely an example, and no such limitation is intended. The liquid crystal display device includes a liquid crystal panel 610 including the display portion 500, a PCB assembly (PCBA) 620 serving as a drive substrate, and a flexible printed circuit board (FPC) 630. The liquid crystal panel 610 includes a TFT array substrate 617 including the pixel electrode 51 and on which a TFT array is formed, a counter substrate 618 on which the common electrode 54, a color filter, and the like are formed, and a liquid crystal layer 619 sandwiched between the TFT array substrate 617 and the counter substrate 618 (see FIG. 4). Note that illustration of a polarizer is omitted from FIG. 4.

The source driver 300 is provided in the form of an IC chip in a frame region on the TFT array substrate 617 constituting the liquid crystal panel 610. Note that the gate driver 200 is formed in a monolithic manner on the TFT array substrate 617. A wiring line for transmitting various signals from the timing controller 100 to the liquid crystal panel 610, and the like are formed on the FPC 630. The PCBA 620 is provided with the timing controller 100 and the common electrode driver 400. The common electrode driver 400 is provided with a common voltage control signal VCTL from the timing controller 100. In this regard, for example, inter-integrated circuit (I2C) communication is adopted as a communication interface between the timing controller 100 and the common electrode driver 400.

In the present embodiment, the common electrode 54 is one planar electrode, and an in-panel common voltage (voltage of the common electrode 54 in the liquid crystal panel 610) is provided as a feedback voltage VcomFB to the common electrode driver 400 through a dedicated wiring line that connects one point on the one electrode and the common electrode driver 400.

Note that, when an IPS mode is adopted as a mode of a liquid crystal, the pixel electrode 51 and the common electrode 54 are formed on the same substrate. The disclosure can also be applied to such a case.

Next, operations of the constituent elements illustrated in FIG. 2 will be described. The timing controller 100 controls an operation of the gate driver 200, the source driver 300, and the common electrode driver 400. Specifically, the timing controller 100 receives image data DAT and a timing signal group (a horizontal synchronization signal, a vertical synchronization signal, and the like) TG transmitted from the outside, and outputs a digital video signal DV, a gate control signal GCTL for controlling an operation of the gate driver 200, a source control signal SCTL for controlling an operation of the source driver 300, and a common voltage control signal VCTL for controlling an operation of the common electrode driver 400. The gate control signal GCTL includes a gate start pulse signal, a gate clock signal, and the like. The source control signal SCTL includes a source start pulse signal, a source clock signal, a latch strobe signal, and the like. The common voltage control signal VCTL includes a switch control signal SWCTL described later and a resistance value control signal SR described later.

The gate driver 200 repeats application of an active scanning signal to each of the gate bus lines GL with one vertical scanning period as a cycle, based on the gate control signal GCTL transmitted from the timing controller 100.

The source driver 300 applies a driving video signal to each of the source bus lines SL, based on the digital video signal DV and the source control signal SCTL transmitted from the timing controller 100. At this time, the source driver 300 sequentially holds the digital video signals DV indicating respective voltages to be applied to the corresponding source bus lines SL at timing at which pulses of the source clock signal are generated. Then the held digital video signals DV are converted into analog voltages at timing at which pulses of the latch strobe signal are generated. The converted analog voltages are concurrently applied to all of the source bus lines SL as the driving video signals.

The common electrode driver 400 receives a reference voltage VREF being a voltage serving as a reference for common voltage generation, the common voltage control signal VCTL transmitted from the timing controller 100, and the feedback voltage VcomFB described above, and outputs, as an output common voltage VcomOUT, a voltage obtained by appropriately correcting the reference voltage VREF. The output common voltage VcomOUT is applied to the common electrode 54.

As described above, while the common voltage is applied to the common electrode 54, the scanning signal is applied to the gate bus line GL and the driving video signal is applied to the source bus line SL, whereby an image based on the image data DAT transmitted from the outside is displayed on the display portion 500.

2. Configuration of Common Electrode Driver

Figure 1:
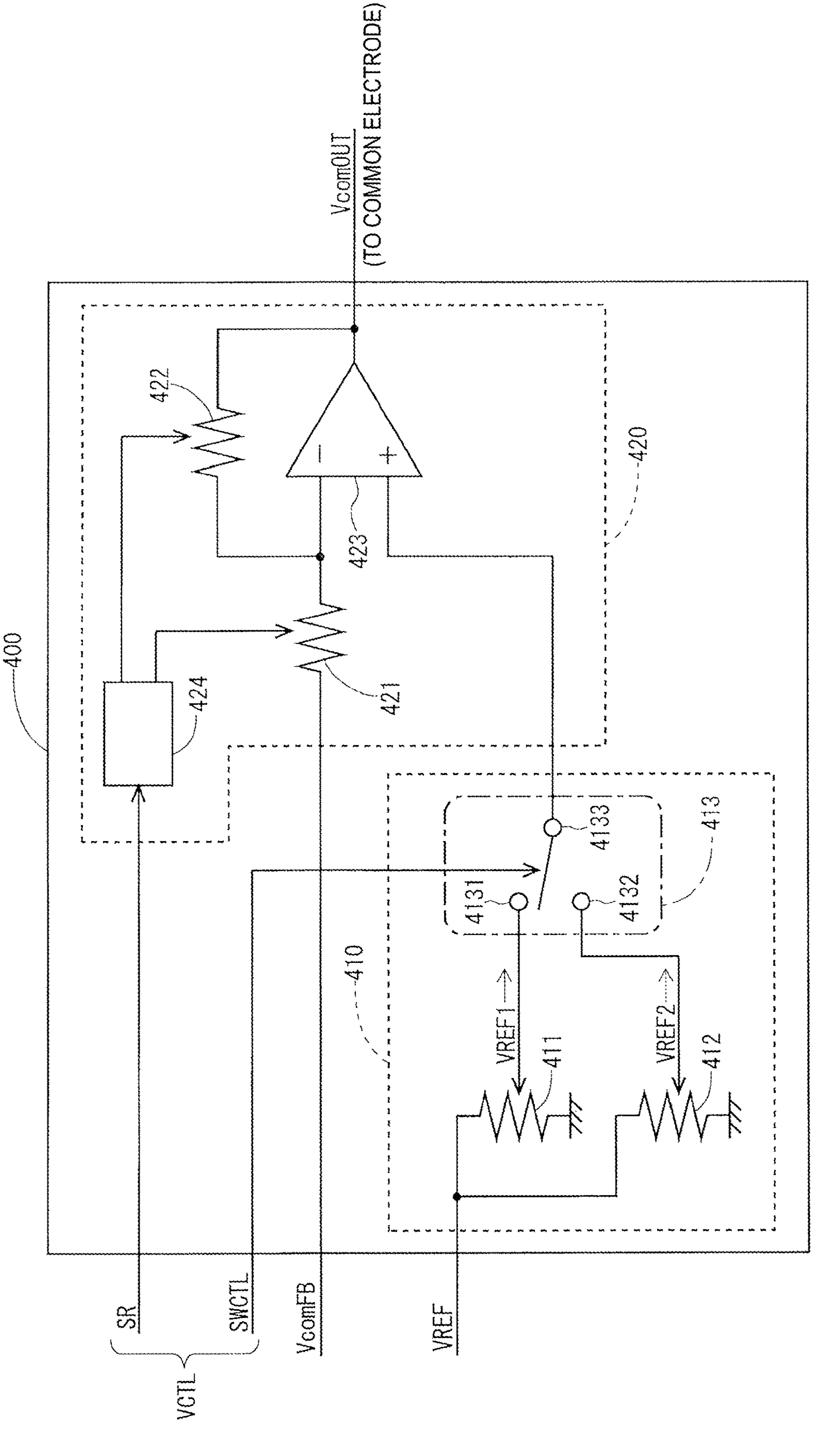
FIG. 1 is a circuit diagram illustrating a configuration of a common electrode driver according to one embodiment.

A configuration of the common electrode driver 400 according to the present embodiment will be described with reference to FIG. 1. As illustrated in FIG. 1, the common electrode driver 400 in the present embodiment includes an offset voltage setting circuit 410 and a Vcom feedback circuit 420. Note that it is assumed that the liquid crystal display device according to the present embodiment is configured to switch between normal driving in which a drive frequency is 60 Hz and low-frequency driving in which a drive frequency is 30 Hz. However, the configuration is not limited thereto.

The offset voltage setting circuit 410 includes a resistor 411, a resistor 412, and a changeover switch 413. One end of the resistor 411 is provided with the reference voltage VREF, and the other end is grounded. One end of the resistor 412 is also provided with the reference voltage VREF, and the other end is grounded. The resistor 411 and the resistor 412 are each a variable resistor. A first reference voltage VREF1 is taken out from a tap of the resistor 411, and a second reference voltage VREF2 is taken out from a tap of the resistor 412. The changeover switch 413 includes a first input terminal 4131 provided with the first reference voltage VREF1, a second input terminal 4132 provided with the second reference voltage VREF2, and an output terminal 4133 connected to a non-inverting input terminal of the operational amplifier 423 in the Vcom feedback circuit 420. In the changeover switch 413, a connection destination of the output terminal 4133 is switched between the first input terminal 4131 and the second input terminal 4132 based on the switch control signal SWCTL transmitted from the timing controller 100. Note that the offset voltage setting circuit 410 realizes a reference voltage changing circuit.

In the present embodiment, it is assumed that a voltage value of the first reference voltage VREF1 is higher than a voltage value of the second reference voltage VREF2, and that the output terminal 4133 is connected to the first input terminal 4131 at the time of the normal driving and the output terminal 4133 is connected to the second input terminal 4132 at the time of the low-frequency driving. In other words, a higher voltage is provided to the non-inverting input terminal of the operational amplifier 423 in the Vcom feedback circuit 420 at the time of the normal driving than at the time of the low-frequency driving. However, the configuration is not limited thereto.

The Vcom feedback circuit 420 includes a resistor 421, a resistor 422, an operational amplifier 423, and a resistance ratio adjustment circuit 424. Note that a first resistor is realized by the resistor 421, and a second resistor is realized by the resistor 422. One end of the resistor 421 is provided with the feedback voltage VcomFB, and the other end is connected to an inverting input terminal of the operational amplifier 423 and to one end of the resistor 422. One end of the resistor 422 is connected to the other end of the resistor 421 and to the inverting input terminal of the operational amplifier 423, and the other end is connected to an output terminal of the operational amplifier 423 and to the common electrode 54. The inverting input terminal of the operational amplifier 423 is connected to the other end of the resistor 421 and to one end of the resistor 422, the non-inverting input terminal is connected to the output terminal 4133 of the changeover switch 413, and the output terminal is connected to the other end of the resistor 422 and to the common electrode 54. The resistance ratio adjustment circuit 424 controls a resistance value of at least one of the resistor 421 and the resistor 422 based on the resistance value control signal SR transmitted from the timing controller 100, and thus adjusts a resistance ratio (ratio of the resistance value of the resistor 422 to the resistance value of the resistor 421). Note that the resistance value control signal SR is transmitted from the timing controller 100 to the common electrode driver 400 such that the resistance ratio is adjusted in accordance with a length of one horizontal scan period.

When a voltage that is to be applied to the common electrodes 54 (the first reference voltage VREF1 or the second reference voltage VREF2 in the present embodiment) and that is to be provided to the non-inverting input terminal of the operational amplifier 423 is referred to as a "target voltage", since an inverting amplifier is formed of the resistor 421, the resistor 422, and the operational amplifier 423, as understood from FIG. 1, when the feedback voltage VcomFB is higher than the target voltage, a voltage lower than the target voltage is output as the output common voltage VcomOUT from the output terminal of the operational amplifier 423, and, when the feedback voltage VcomFB is lower than the target voltage, a voltage higher than the target voltage is output as the output common voltage VcomOUT from the output terminal of the operational amplifier 423. By supplying the voltage obtained by correcting the target voltage to the common electrode 54, the in-panel common voltage in a fluctuating state gradually converges to the target voltage. A degree of correction of the target voltage at that time depends on the resistance ratio. In other words, the time required for the in-panel common voltage in a fluctuating state to converge to the target voltage depends on the resistance ratio. Note that the resistance ratio is adjusted in accordance with a length of one horizontal scan period, which will be described in detail later.

As described above, the resistance ratio adjustment circuit 424 controls a resistance value of at least one of the resistor 421 and the resistor 422. In other words, a configuration in which the resistor 421 is a variable resistor and the resistance ratio adjustment circuit 424 adjusts a resistance ratio by changing a resistance value of the resistor 421 based on the resistance value control signal SR may be adopted, a configuration in which the resistor 422 is a variable resistor and the resistance ratio adjustment circuit 424 adjusts a resistance ratio by changing a resistance value of the resistor 422 based on the resistance value control signal SR may be adopted, or a configuration in which the resistor 421 and the resistor 422 are each a variable resistor and the resistance ratio adjustment circuit 424 adjusts a resistance ratio by changing a resistance value of the resistor 421 and the resistor 422 based on the resistance value control signal SR may be adopted.

3. Adjustment of Resistance Ratio

Next, an adjustment of a resistance ratio (ratio of a resistance value of the resistor 422 to a resistance value of the resistor 421) will be described. In the present embodiment, the resistance ratio is adjusted such that the resistance ratio becomes smaller as a length of one horizontal scan period becomes longer. More specifically, the resistance ratio is adjusted such that the resistance ratio is inversely proportional to the length of one horizontal scan period. Here, a preferable resistance ratio when the length of one horizontal scan period is T1 is represented by K1. Then, the resistance ratio when the length of one horizontal scan period is T2 is K1×(T1/T2). Note that the resistance value control signal SR is transmitted from the timing controller 100 to the common electrode driver 400 such that the resistance ratio is adjusted in the Vcom feedback circuit 420.

A more specific example will be described. Note that a resistance value of the resistor 421 is represented by Ra, and a resistance value of the resistor 422 is represented by Rb. As described above, in the present embodiment, switching between normal driving in which a drive frequency is 60 Hz and low-frequency driving in which a drive frequency is 30 Hz is performed. It is also assumed that a full high-vision (FHD) liquid crystal panel is employed (that is, an effective display period corresponding to a length of 1080 horizontal scan periods is provided), and that a retrace period corresponding to a length of 31 horizontal scan periods is provided for each frame.

It is assumed that suitable operation is performed when the resistance value Ra is 2 kS) and the resistance value Rb is 6 kS) at the time of the normal driving. Then, the resistance ratio at the time of the normal driving is 3. Here, the resistance ratio at the time of the normal driving is assigned to K1 described above, a length of one horizontal scan period at the time of the normal driving is assigned to T1 described above, and a length of one horizontal scan period at the time of the low-frequency driving is assigned to T2 described above. When μs is used as the unit representing a length of a period, the length T1 of one horizontal scan period at the time of the normal driving is 15 μs as indicated in the following equation (1), and the length T2 of one horizontal scan period at the time of the low-frequency driving is 30 μs as indicated in the following equation (2).

$$T1 = 1000000/(60\times(1080+31)) = 15 \tag{1}$$

$$T2 = 1000000/(30\times(1080+31)) = 30 \tag{2}$$

As described above, the resistance ratio K1 at the time of the normal driving is 3, the length T1 of one horizontal scan period at the time of the normal driving is 15 μs, and the length T2 of one horizontal scan period at the time of the low-frequency driving is 30 μs. At this time, the resistance ratio K2 at the time of the low-frequency driving is 1.5 as indicated in the following equation (3).

$$\begin{aligned} K2 &= K1\times(T1/T2) \\ &= 3\times(15/30) \\ &= 1.5 \end{aligned} \tag{3}$$

As described above, at the time of the low-frequency driving, so that the resistance ratio is 1.5, at least one of the resistance value Ra and the resistance value Rb is changed to a value different from a value at the time of the normal driving. As an example, the resistance value Ra is maintained at 2 kΩ, and the resistance value Rb is changed from 6 kΩ to 3 kΩ. In this case, when the low-frequency driving is switched to the normal driving, the resistance value Rb is changed from 3 kΩ to 6 kΩ.

Figure 5:
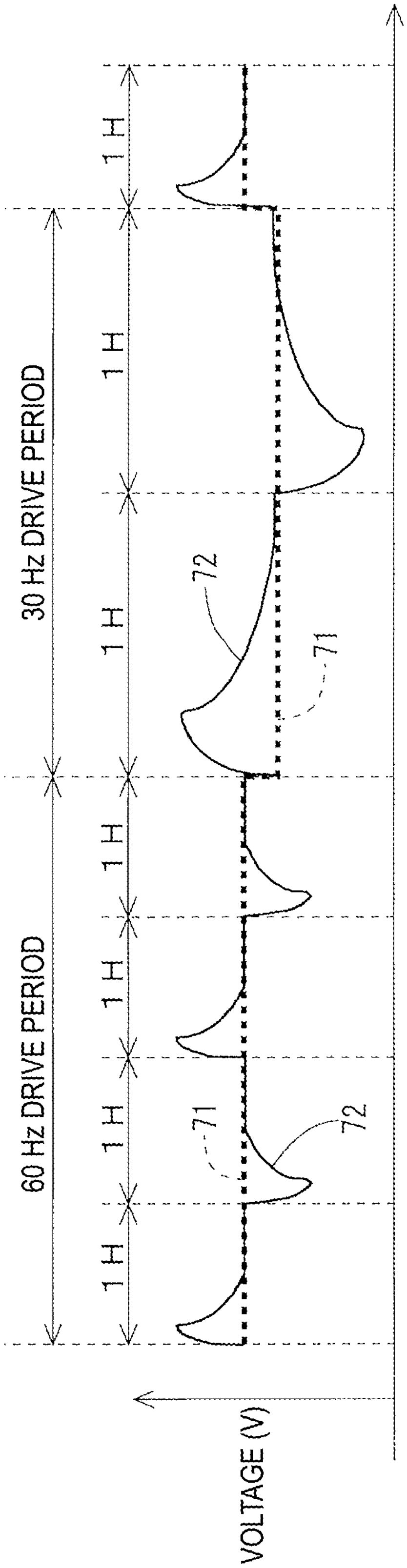
FIG. 5 is a waveform diagram for describing a fluctuation of an in-panel common voltage according to the embodiment.

By adjusting the resistance ratio as described above, the time required for the in-panel common voltage to converge is longer at the time of the low-frequency driving than at the time of the normal driving. For example, when a waveform of the output common voltage VcomOUT is a waveform indicated by a thick dotted line denoted by a reference sign 71 in FIG. 5, a waveform of the in-panel common voltage is a waveform indicated by a solid line denoted by a reference sign 72 in FIG. 5. Note that it is understood from FIG. 5 that the in-panel common voltage converges to the target voltage by the end of the horizontal scan period at the time of both the normal driving (60 Hz drive period) and the low-frequency driving (30 Hz drive period). Therefore, the occurrence of crosstalk is suppressed.

4. Effects

Figure 6:
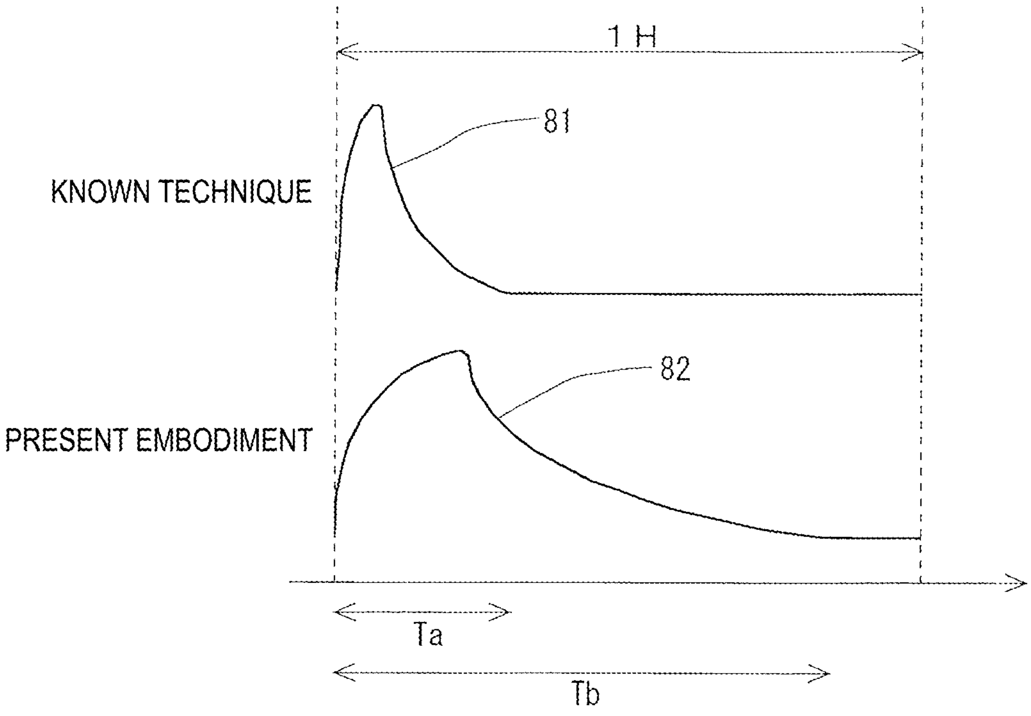
FIG. 6 is a diagram for describing an effect of the embodiment.
Figure 7:
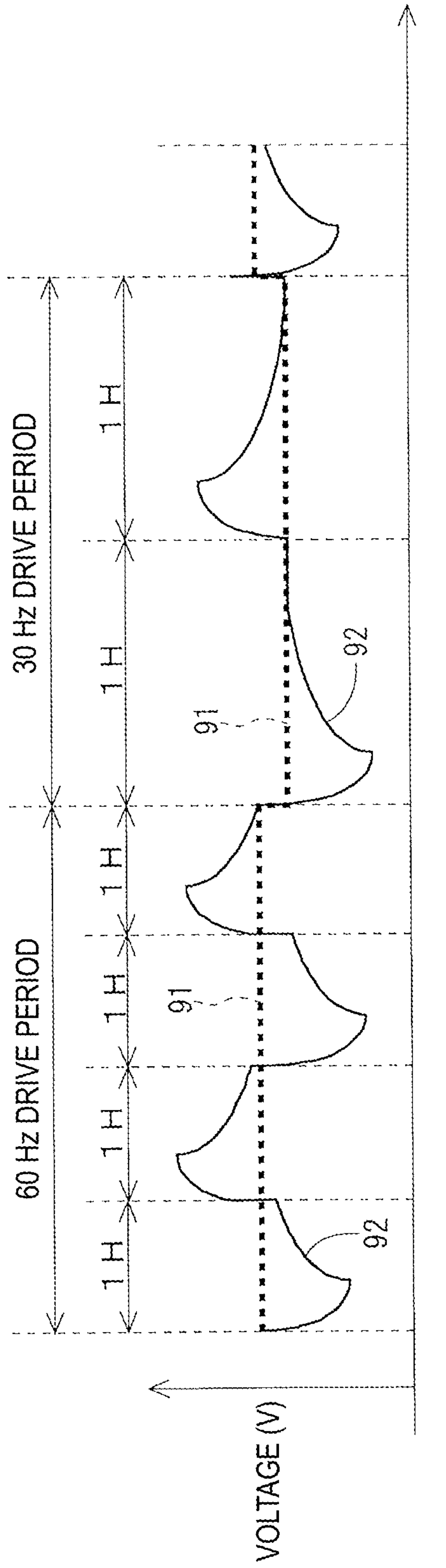
FIG. 7 is a waveform diagram for describing a fluctuation of the in-panel common voltage in relation to a known technique.
Figure 8:
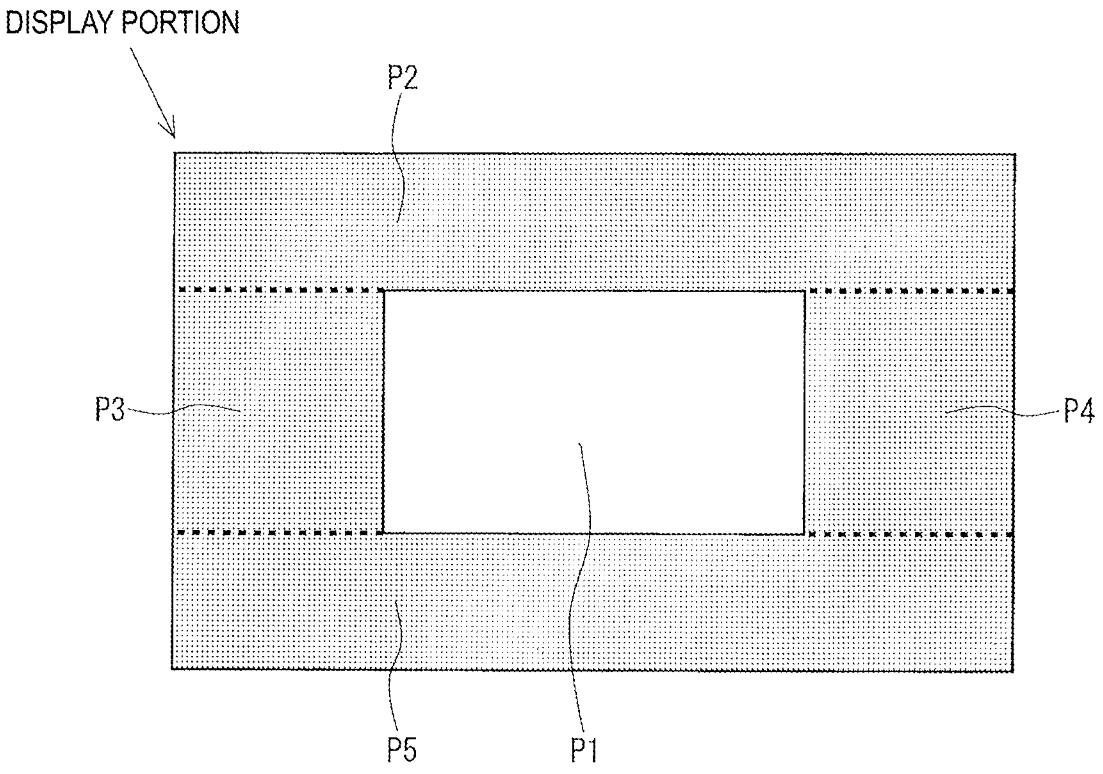
FIG. 8 is a diagram for describing crosstalk occurring in the known technique.
Figure 9:
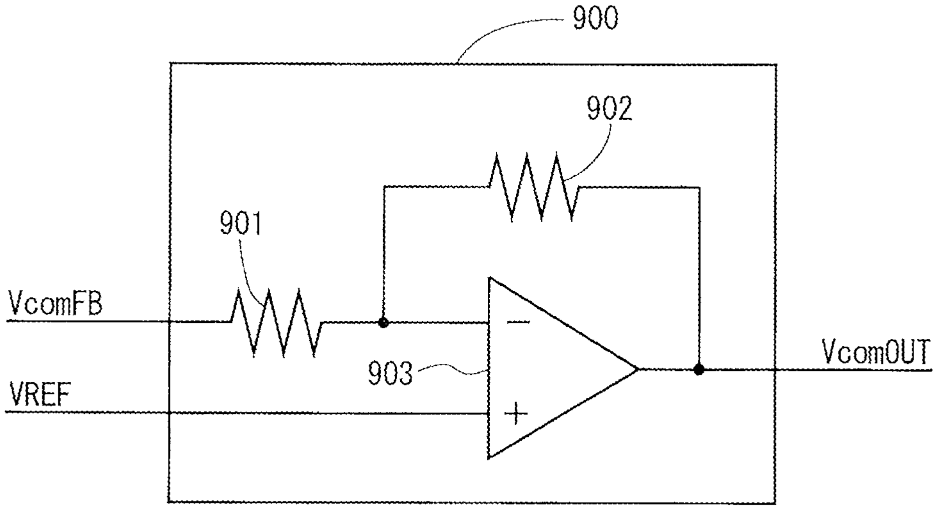
FIG. 9 is a circuit diagram illustrating a configuration of a Vcom feedback circuit in relation to the known technique.
Figure 10:
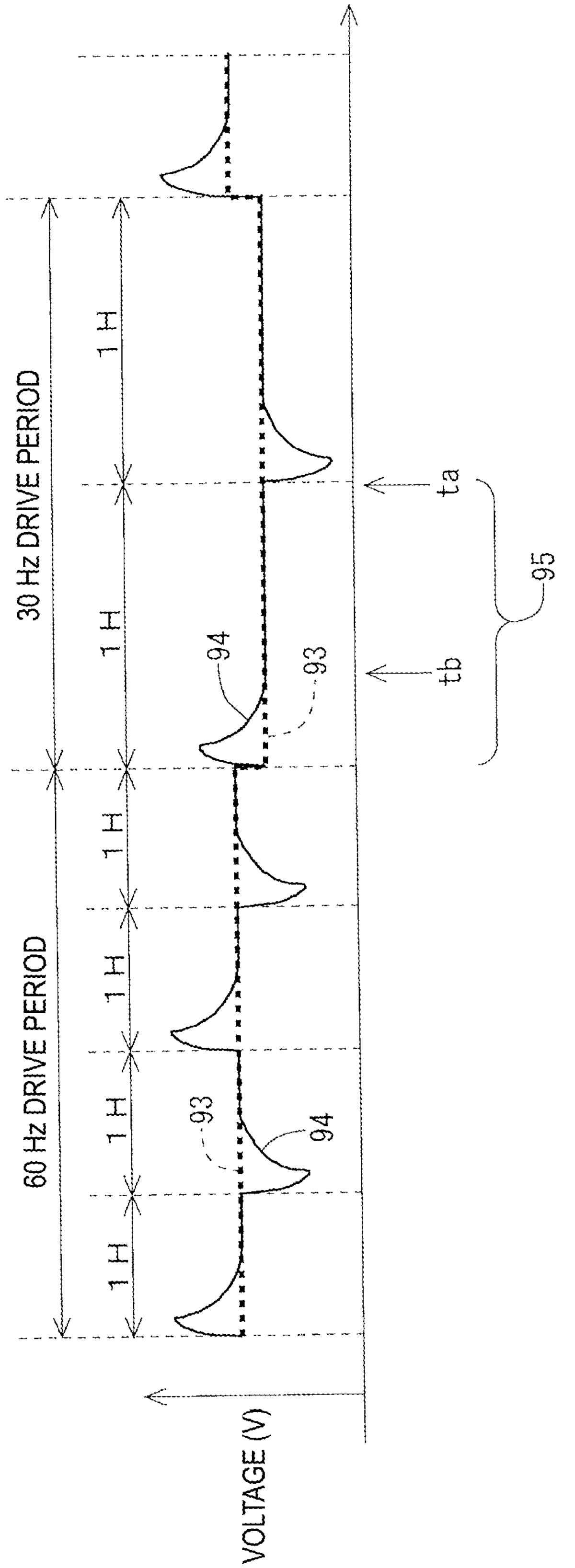
FIG. 10 is a waveform diagram for describing that the in-panel common voltage converges similarly at a time of normal driving and at a time of low-frequency driving in the known technique.

According to the present embodiment, the common electrode driver 400 includes the Vcom feedback circuit 420 that outputs, as the output common voltage VcomOUT, a voltage obtained by correcting a target voltage being a voltage to be applied to the common electrodes 54 (a voltage provided to the non-inverting input terminal of the operational amplifier 423 constituting the inverting amplifier) based on the feedback voltage VcomFB (a voltage obtained by feeding back the in-panel common voltage through a dedicated wiring line). The Vcom feedback circuit 420 is provided with the resistance ratio adjustment circuit 424 that adjusts, in accordance with a length of one horizontal scan period, a resistance ratio of the two resistors 421 and 422 constituting the inverting amplifier (a ratio of a resistance value of the resistor 422 to a resistance value of the resistor 421). Then, the resistance ratio adjustment circuit 424 controls the resistance value of at least one of the resistor 421 and the resistor 422, and thus sets the resistance ratio at the time of the low-frequency driving to be smaller than the resistance ratio at the time of the normal driving. As a result, a degree of correction (correction intensity) with respect to the target voltage is smaller at the time of the low-frequency driving than at the time of the normal driving, and the in-panel common voltage more gradually converges to the target voltage at the time of the low-frequency driving than at the time of the normal driving. In this way, at the time of the low-frequency driving, a waveform of the in-panel common voltage that changes as indicated by a solid line denoted by a reference sign 81 in FIG. 6 in the known technique becomes a waveform as indicated by a solid line denoted by a reference sign 82 in FIG. 6 in the present embodiment. While time Ta is required for the in-panel common voltage to converge in the known technique, time Tb is required for the in-panel common voltage to converge in the present embodiment. As the degree of correction (correction intensity) with respect to the target voltage becomes smaller, the time required for the in-panel common voltage to converge becomes longer, but the power consumption in the operational amplifier 423 becomes smaller. Thus, it is understood from FIG. 6 that the power consumption in the present embodiment is smaller than that in the known technique. Further, when a resistance value of the resistor 421 and the resistor 422 is appropriately set, the in-panel common voltage converges to the target voltage by the end of the horizontal scan period at the time of both the normal driving and the low-frequency driving, and thus the occurrence of crosstalk is suppressed. As described above, the present embodiment realizes a liquid crystal display device capable of suppressing the occurrence of crosstalk while suppressing an increase in power consumption.

According to the present embodiment, the common electrode driver 400 includes the offset voltage setting circuit 410 for switching the target voltage between the first reference voltage VREF1 and the second reference voltage VREF2. In this way, the target voltage is appropriately set in accordance with a refresh cycle, and the occurrence of flicker caused by an effective voltage imbalance is suppressed.

5. Other

In the embodiment described above, a case where switching between normal driving in which a drive frequency is 60 Hz and low-frequency driving in which a drive frequency is 30 Hz is performed is described as an example, but a specific numerical value of the drive frequency is not particularly limited. Further, a specific numerical value of the length of one horizontal scan period is also not particularly limited. Regardless of these specific numerical values, the resistance ratio adjustment circuit 424 may adjust a resistance ratio in accordance with the length of one horizontal scan period, the resistance ratio being a ratio of the resistance value Rb of the resistor 422 to the resistance value Ra of the resistor 421. Further, in a case where switching between first driving in which the length of one horizontal scan period is a first time and second driving in which the length of one horizontal scan period is a second time longer than the first time is performed, the resistance ratio adjustment circuit 424 may set a resistance ratio when the second driving is performed to be smaller than a resistance ratio when the first driving is performed. In this regard, provided that N is a number greater than 1 and the second time is N times the first time, the resistance ratio adjustment circuit 424 preferably sets the resistance ratio when the second driving is performed to be 1/N of the resistance ratio when the first driving is performed. By adjusting the resistance ratio to be inversely proportional to the length of one horizontal scan period in such a manner, it is possible to more effectively suppress the occurrence of crosstalk while suppressing an increase in power consumption.

In the embodiment described above, switching between two types of drive frequencies (60 Hz and 30 Hz) is performed, but the disclosure is not limited thereto, and can be applied to a case where switching between three or more types of drive frequencies is performed. In other words, the disclosure can be applied to a case where switching between three or more types of driving modes having different lengths of one horizontal scan period is performed.

Although the disclosure has been described in detail above, the above description is exemplary in all respects and is not limited thereto. It is understood that numerous other modifications or variations can be made without departing from the scope of the disclosure.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display device comprising:

a display portion including a plurality of video signal lines, a plurality of scanning signal lines, a plurality of pixel electrodes provided corresponding to each of intersections between the plurality of video signal lines and the plurality of scanning signal lines, and a common electrode provided common to the plurality of pixel electrodes;

a video signal line drive circuit configured to drive the plurality of video signal lines;

a scanning signal line drive circuit configured to drive the plurality of scanning signal lines; and a common electrode drive circuit configured to drive the common electrode, wherein the common electrode drive circuit includes an operational amplifier including an inverting input terminal, a non-inverting input terminal provided with a reference voltage being a voltage to be applied to the common electrode, and an output terminal connected to the common electrode, a first resistor having one end provided with a feedback voltage of a voltage of the common electrode, and having another end connected to the inverting input terminal of the operational amplifier, a second resistor having one end connected to the inverting input terminal of the operational amplifier, and having another end connected to the output terminal of the operational amplifier, and a resistance ratio adjustment circuit configured to adjust, in accordance with a length of one horizontal scan period, a resistance ratio being a ratio of a resistance value of the second resistor to a resistance value of the first resistor, wherein the resistance ratio adjustment circuit controls the resistance value of at least one of the first resistor and the second resistor to set the resistance ratio when second driving is performed, in which the length of one horizontal scan period is a second time longer than a first time, to be smaller than the resistance ratio when first driving is performed, in which the length of one horizontal scan period is the first time, and provided that N is a number greater than 1 and the second time is N times the first time, the resistance ratio adjustment circuit sets the resistance ratio when the second driving is performed to be 1/N of the resistance ratio when the first driving is performed.

2. The liquid crystal display device according to claim 1, wherein the first resistor is a variable resistor, and the resistance ratio adjustment circuit adjusts the resistance ratio by changing the resistance value of the first resistor.

3. The liquid crystal display device according to claim 1, wherein the second resistor is a variable resistor, and the resistance ratio adjustment circuit adjusts the resistance ratio by changing the resistance value of the second resistor.

4. The liquid crystal display device according to claim 1, wherein the first resistor and the second resistor are each a variable resistor, and the resistance ratio adjustment circuit adjusts the resistance ratio by changing the resistance value of the first resistor and the resistance value of the second resistor.

5. The liquid crystal display device according to claim 1, wherein the common electrode drive circuit further includes a reference voltage changing circuit configured to set a different voltage value of the reference voltage provided to the non-inverting input terminal of the operational amplifier when the first driving is performed and when the second driving is performed.

6. A driving method for a liquid crystal display device, wherein:

the liquid crystal display device includes a display portion including a plurality of video signal lines, a plurality of scanning signal lines, a plurality of pixel electrodes provided corresponding to each of intersections between the plurality of video signal lines and the plurality of scanning signal lines, and a common electrode provided common to the plurality of pixel electrodes, a video signal line drive circuit configured to drive the plurality of video signal lines, a scanning signal line drive circuit configured to drive the plurality of scanning signal lines, and a common electrode drive circuit configured to drive the common electrode, the common electrode drive circuit includes an operational amplifier including an inverting input terminal, a non-inverting input terminal provided with a reference voltage being a voltage to be applied to the common electrode, and an output terminal connected to the common electrode, a first resistor having one end provided with a feedback voltage of a voltage of the common electrode, and having another end connected to the inverting input terminal of the operational amplifier, and a second resistor having one end connected to the inverting input terminal of the operational amplifier, and having another end connected to the output terminal of the operational amplifier, and the driving method comprises:

adjusting, in accordance with a length of one horizontal scan period, a resistance ratio being a ratio of a resistance value of the second resistor to a resistance value of the first resistor;

controlling, during the adjusting, the resistance value of at least one of the first resistor and the second resistor to set the resistance ratio when second driving is performed, in which the length of one horizontal scan period is a second time longer than a first time, to be smaller than the resistance ratio when first driving is performed, in which the length of one horizontal scan period is the first time; and during the adjusting, provided that N is a number greater than 1 and the second time is N times the first time, setting the resistance ratio, when the second driving is performed, to be 1/N of the resistance ratio when the first driving is performed.

* * * * *